United States Patent
Paulk et al.

(10) Patent No.: US 6,184,685 B1
(45) Date of Patent: Feb. 6, 2001

(54) MULITIPLE SPACING RESISTIVITY MEASUREMENTS WITH RECEIVER ARRAYS

(75) Inventors: Martin D. Paulk, Houston; Haoshi Song, Sugar Land, both of TX (US)

(73) Assignee: Halliburton Energy Services, Inc., Houston, TX (US)

( * ) Notice: Under 35 U.S.C. 154(b), the term of this patent shall be extended for 0 days.

(21) Appl. No.: 09/255,302

(22) Filed: Feb. 22, 1999

(51) Int. Cl.$^7$ ................................. G01V 3/18; G01V 3/30
(52) U.S. Cl. ............................................. 324/338; 324/339
(58) Field of Search .................................... 324/338–343; 702/7; 175/50

(56) References Cited

U.S. PATENT DOCUMENTS

| | | | |
|---|---|---|---|
| 3,086,168 | * | 4/1963 | Buckner, Jr. ........................ 324/339 |
| 3,383,586 | * | 5/1968 | Hoehn, Jr. ........................... 324/338 |
| 3,449,657 | * | 6/1969 | Fredriksson et al. ............... 324/338 |
| 3,706,025 | * | 12/1972 | Regat .................................. 324/339 |
| 4,107,597 | * | 8/1978 | Meador et al. ................. 324/339 X |
| 4,185,238 | * | 1/1980 | Huchital et al. .................... 324/338 |
| 4,574,242 | * | 3/1986 | Clark et al. ......................... 324/338 |
| 4,730,161 | * | 3/1988 | Cox et al. ........................... 324/338 |
| 4,972,149 | * | 11/1990 | Cox et al. ........................... 324/339 |
| 5,736,860 | * | 4/1998 | Chaillout et al. ................... 324/339 |
| 5,811,973 | * | 9/1998 | Meyer, Jr. ..................... 324/339 X |

\* cited by examiner

Primary Examiner—Gerard Strecker
(74) Attorney, Agent, or Firm—Conley, Rose & Tayon, P.C.

(57) ABSTRACT

A wireline, coiled tubing, and measurement while drilling resistivity tool having three or more receivers is disclosed. This results in a tool capable of gathering substantial resistivity data about a subterranean formation while being drawn quickly past a borehole wall. One embodiment of this resistivity tool includes four receivers and a pair of transmitters, resulting in six resistivity measurements from each firing of a transmitter. The transmitters are arranged to obtain a regularly spaced series of resistivity measurements. The transmitters may be fired at two or more frequencies to result in further information about the formation. Another embodiment of this resistivity tool places its transmitters and receivers to obtain a number of redundant resistivity readings, resulting in error checking and increased reliability. For enhanced performance, transceivers may also be used. An analogous method is also disclosed.

18 Claims, 6 Drawing Sheets

MULITIPLE SPACING RESISTIVITY MEASUREMENTS WITH RECEIVER ARRAYS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Wells, also known as wellbores or boreholes, are drilled to reach underground petroleum and other subterranean hydrocarbons. While or after a well is being drilled, a great quantity of information relating to parameters and conditions downhole is desirable. Such information typically includes characteristics of the earth formations traversed by the wellbore, in addition to data relating to the size and configuration of the borehole itself. The collection of information relating to conditions downhole, which commonly is referred to as "logging," can be performed by several methods. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole, as the sonde is pulled uphole.

While wireline logging is useful in assimilating information relating to formations downhole, it nonetheless has certain disadvantages. For example, before the wireline logging tool can be run in the wellbore, the drillstring and bottomhole assembly must first be removed or tripped from the borehole, resulting in considerable cost and loss of drilling time for the driller (who typically is paying daily fees for the rental of drilling equipment). In addition, because wireline tools are unable to collect data during the actual drilling operation, drillers must at times make decisions (such as the direction to drill, etc.) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be questionable. As one skilled in the art will understand, the wellbore conditions tend to degrade as drilling fluids invade the formation in the vicinity of the wellbore. In addition, the borehole shape may begin to degrade, reducing the accuracy of the measurements.

Because of these limitations associated with wireline logging, there was an emphasis on developing tools that could collect data during the drilling process itself. By collecting and processing data during the drilling process, without the necessity of tripping the drilling assembly to insert a wireline logging tool, the driller can make accurate modifications or corrections "real-time", as necessary, to optimize drilling performance. With a steerable system the driller may change the direction in which the drill bit is headed. By detecting the adjacent bed boundaries, adjustments can be made to keep the drill bit in an oil rich layer or region. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term MWD will be used with the understanding that the term encompasses both the collection of formation parameters and the collection of information relating to the position of the drilling assembly while the bottomhole assembly is in the well.

The measurement of formation properties during drilling of the well by MWD systems improves the timeliness of measurement data and, consequently, increases the efficiency of drilling operations. Typically, MWD measurements are used to provide information regarding the particular formation through which the borehole crosses. Currently, logging sensors or tools that commonly are used as part of either a wireline or an MWD system include resistivity tools. Resistivity tools are effective because for a formation to contain petroleum, and for the formation to permit the petroleum to flow through it, the rock comprising the formation must have certain well known physical characteristics. One characteristic is that the formation has a certain measurable resistivity (the inverse of conductivity), which can be determined by providing an electromagnetic wave of a particular frequency through the formation. As will be apparent to one skilled in the art, the propagating wave suffers both attenuation and phase shift as it travels through the formation. Analysis of this attenuation and phase shift provides the resistivity of the formation surrounding the resistivity tool.

Ordinarily, a well is drilled vertically for at least a portion of its final depth. The layers or strata that make up the earth's crust are generally substantially horizontal. Therefore, during vertical drilling, the well is substantially perpendicular to the geological formations through which it passes. In certain applications, however, such as when drilling from an off-shore platform, or when drilling through formations in which the reservoir boundaries extend horizontally, it is desirable to drill wells that are oriented more horizontally. When drilling horizontally, it is desirable to maintain the well bore in the pay zone (the formation which contains hydrocarbons) as much as possible so as to maximize the recovery. This can be difficult since formations may dip or divert. Thus, while attempting to drill and maintain the well bore within a particular formation, the drill bit may approach a bed boundary. Many in the industry have noted the desirability of an MWD system that could be especially used to detect bed boundaries and to provide real-time data to the driller to enable the driller to make directional corrections to stay in the pay zone. Alternatively, the MWD system could be used as part of a "Smart" system to automatically maintain the drill bit in the pay zone. See, e.g. commonly assigned U.S. Pat. No. 5,332,048, the teachings of which are incorporated by reference herein. The assignee has also developed a system that permits the measurement of MWD data at the drill bit to provide an earlier indication of bed boundaries and formation characteristics. See U.S. Pat. No. 5,160,925. The use of an MWD system with these other systems makes it possible to conduct at least certain portions of drilling automatically.

The various "beds" or layers in the earth have characteristic resistivities which can be used to identify their position. For example, in a so-called "shaley-sand" formation, the shale bed can have a low resistivity of about 1 ohm per meter. A bed of oil-saturated sandstone, on the other hand, is likely to have a higher resistivity of about 10 ohms per meter, or more. The sudden change in resistivity at the boundary between beds of shale and sandstone can be used to locate these boundaries. In horizontal drilling, the drill bit preferably can then be steered to avoid this boundary and keep the wellbore inside the oil-producing bed. However, to accomplish this detection reliably, a great deal of data is required from the resistivity tool.

Figure 2:
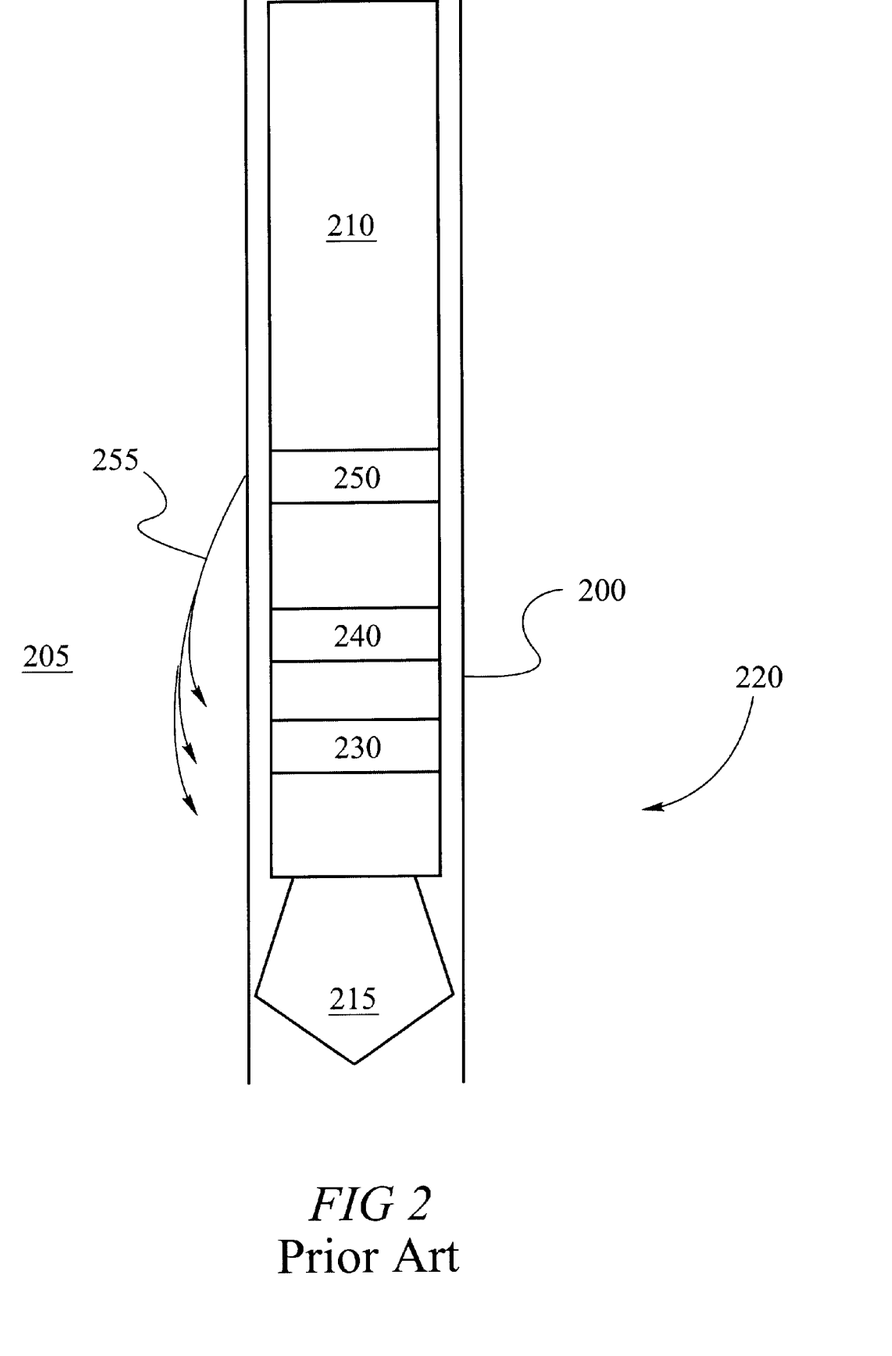
FIG. 2 is a side view of a first resistivity tool.

Resistivity tools have undergone a substantial evolution in order to obtain more resistivity data. FIG. 2 shows an early resistivity tool 220 as part of a bottomhole assembly. A well bore 200 is drilled through formation 205, and contains a drill string 210. Attached to drill string 210 is drill bit 215. A first receiver 230 is as close as practical to the drill bit 215, while a second receiver 240 and a single transmitter 250 are located further up the drill string. Transmitter 250 generates an electromagnetic (EM) wave 255 at a selected frequency that flows toward receivers 230, 240 via the formation 205. EM wave 255 is measured at receivers 230 and 240. First and second signals result.

The exact frequency selected for the EM wave depends on certain criteria. On the one hand, as the transmitter 250 is placed further away from the receiver pair 230, 240, signal attenuation becomes more severe. To compensate, the transmitter may use more power to generate a stronger signal that can be detected by the receiver pair. But because lower frequency signals attenuate more slowly than do high frequency signals, use of lower frequency signals can reduce or eliminate this need. On the other hand, as the transmitter is placed closer to the receiver pair, phase shift and attenuation become harder to detect. A higher frequency makes this detection easier. Thus, lower frequency signals tend to be preferred as the distance between the transmitter and receiver pair increases, and higher frequency signals tend to be preferred as the distance decreases between the transmitter and the receiver pair.

First and second signals result from receivers 230 and 240, respectively. The difference between the first and second signals can be used to establish the attenuation and phase shift of EM wave 255. Combined with the known distance between the receivers, this yields the resistivity of the formation 205.

Figure 3:
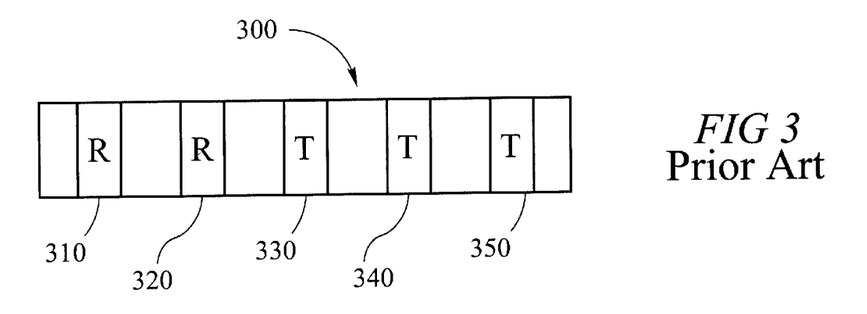
FIG. 3 is a diagram of a second resistivity tool.

Improvements to this design to yield more data have been made. For example, FIG. 3 shows a resistivity tool 300 with three transmitters in addition to a pair of receivers. This tool 300 includes receivers R1 310 and R2 320 in addition to transmitters T1 330, T2 340, and T3 350. The addition of two transmitters provides more resistivity data During operation, a single transmitter fires, such as transmitter T1, sending EM wave at a particular frequency into the formation. The wave is then received at receivers R1 310 and R2 320 and an attenuation and phase shift can be determined. Transmitter T2 then fires at the same frequency, followed by transmitter T3. Each firing results in readings at the two receivers 310 and 320. Multiple readings at the receivers 310 and 320 result in multiple measurements of phase shift and attenuation of the signals. Consequently, a more accurate resistivity profile can be obtained.

Figure 4:
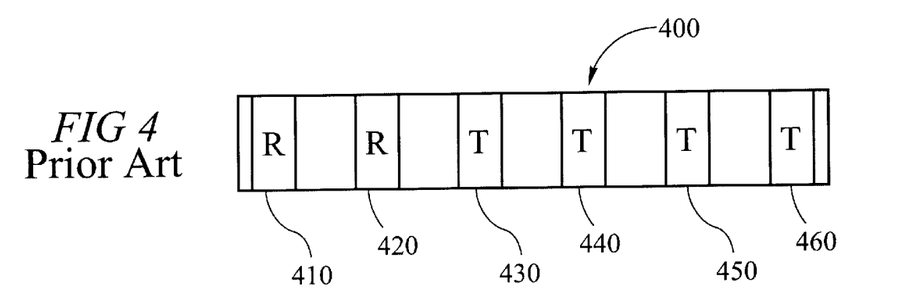
FIG. 4 is a diagram of a third resistivity tool.

FIG. 4 shows a resistivity tool 400 with four transmitters 430, 440, 450, 460 in addition to a pair of receivers 410, 420. As with the resistivity tool shown in FIG. 3, each transmitter fires sequentially, with difference readings being taken between the waveforms detected at the receiver pair. Because transmitter 460 is located further away from the pair of receivers 410, 420, it has been found advantageous to fire this transmitter 460 at a lower frequency than the other transmitters 430, 440, 450. A lower frequency waveform from the transmitter reads deeper than a comparable higher frequency waveform, but results in lower vertical resolution. This lower resolution can be a problem, for example, when attempting to recognize the presence of a thin bed. Thus, it is advantageous in this design to utilize two different frequencies for the set of four transmitters. Moreover, the smaller the distance between a transmitter and a pair of receivers, the less the depth of investigation into the formation. Thus, the addition of a fourth transmitter results in more data being received at the receivers, and a more accurate profile of resistivity around the well bore.

However, the addition of more transmitters to a resistivity tool also leads to some significant drawbacks. In particular, modem resistivity tools are very slow. Each transmitter of these resistivity tools is fired sequentially, meaning that a greater number of transmitters results in a greater number of transmitter firings in any "set" of transmitter-receiver resistivity readings. Because firings occur sequentially, a large number of transmitters results in more time being necessary to complete a set of resistivity readings. In addition, each transmitter-receiver pair spacing corresponds to a different depth of investigation into the formation. With the transmitters being fired sequentially while the resistivity tool is being moved up or down the wellbore, more transmitters result in a greater distance along the borehole wall for identical depth of investigation measurements. Thus, a large number of transmitters slow down the maximum practical speed at which a resistivity tool can proceed past a borehole wall.

A less than ideal rate of movement up or down the borehole is not an insignificant problem. For example, in wireline logging, the sonde is pulled past the borehole wall as quickly as possible to minimize the time required to recover hydrocarbons and to minimize costs. As another example, in the MWD environment, a borehole may already be partially drilled and the drill bit assembly lowered a significant distance into the earth prior to actual drilling. An operator would like to quickly obtain a set of resistivity measurements while the drill string is being lowered downhole in the old wellbore. Further, in certain formations, it is the data acquisition rate of the MWD tools, and not the ability of the drill bit to cut through formation, that is a limiting factor on drilling speed Data acquisition while the drill bit assembly is being "tripped" or pulled up from the borehole is often also desirable. Because multiple transmitter resistivity tools use a long period of time to obtain a "set" of measurements, the disadvantages of a large number of transmitters undermine the advantages of a large number of transmitters.

Compensated resistivity tools have also been developed. The development of compensated resistivity tools was in response to the necessity for temperature characterization of uncompensated resistivity tools. Temperature characterization is necessary because of the range of temperatures a resistivity tool is exposed to as it progresses downhole. This temperature affects the response of the circuitry (e.g. resistors, capacitors) in the resistivity tool. Consequently, for accuracy each uncompensated resistivity tool must be calibrated across a range of temperatures. Further, to maintain accuracy at certain intervals this must be repeated for each tool. This process requires extra time, effort, and expense.

Figure 5:
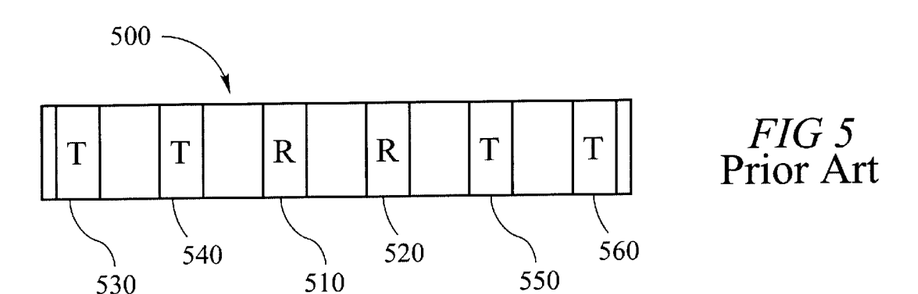
FIG. 5 is a diagram of a fourth resistivity tool.

FIG. 5 shows a resistivity tool with compensation. Tool 500 includes a pair of receivers 510, 520 and four transmitters 530, 540, 550, 560. To increase the number of waveforms received at the receivers, and hence the amount of data, each transmitter is fired at two different frequencies. For example, in addition to a 2 MegaHertz (MHz) frequency, the transmitters of this design may fire at 400 kHz. This results in a deeper investigation into the surrounding formation. Unlike the tool shown in FIG. 4, it can be seen that the compensated tool includes a symmetric pair of transmitters placed ahead of the receivers. The transmitters ahead of the receivers are placed the same distance away from the receivers as the transmitters behind the receivers, and thus have the same depth of investigation into the formation. The results from corresponding pairs of transmitter, may be "averaged" as is known in the art, and the effects of electronic component response due to temperature variations greatly reduced.

Figure 6:
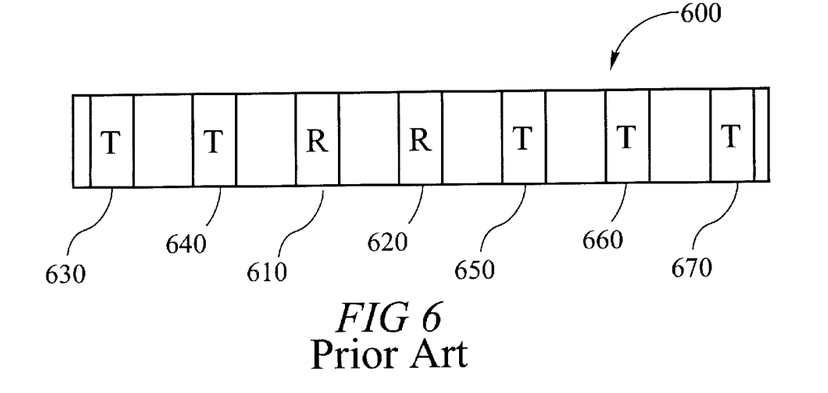
FIG. 6 is a diagram of a fifth resistivity tool.

FIG. 6 shows a resistivity tool with "pseudo-compensation." Tool 600 includes a pair of receivers and a set of transmitters. It can be seen that this design places only two transmitters ahead of the receiver pair, whereas there are three transmitters behind the receiver pair. The location of each transmitter ahead of the receiver pair may be determined because each transmitter is placed half way between where a pair of transmitters would be located were this a fully compensated resistivity tool. One advantage of this design is that the receivers are closer to the drill bit as compared to a fully compensated tool. At the same time, this design also achieves some level of compensation, although temperature characterization is still required to some extent. However, those in the industry are dubious whether the benefits in this design outweigh the error that is introduced by having an unbalanced configuration and the need to place the receivers further away from the drill bit than in an uncompensated design.

Although substantial improvements have been made to resistivity tool design, there still exist numerous problems. As explained, modem resistivity tools are slow and limit the maximum rate at which the tool may proceed past a wellbore wall. In addition, modern resistivity tools have high power requirements because of an increased number of transmitters and because transmitters far away from the receiver pair often tramsmit a stronger signal than transmitters close to the receiver pair. For conventional MWD tools, in particular, power is a very precious commodity and this is another significant drawback. Thus, a resistivity tool is desirable that would be capable of obtaining data regarding the formation near the drill bit in a shorter period of time. Ideally, it would collect nearly the same or a greater amount than conventional resistivity tools. It would also be ideal if this resistivity tool required less power than other known resistivity tools. If this tool also eliminated or reduced other problems, it would also be ideal.

SUMMARY OF THE INVENTION

The present invention may be expressed as a resistivity tool suitable to use in a borehole, including a first transmitter, a first receiver, a second receiver, and a third receiver. Electronics that fire the first transmitter at one or more preselected frequencies are also attached to the first transmitter. Electronics may measure amplitude and phase angle at the receivers, or it may measure the attenuation and phase shift at the receivers.

The distance between the first receiver and the second receiver is preferably the same as the distance between the second receiver and the third receiver. The resistivity tool also preferably includes a second transmitter. Embodiments of the invention include resistivity measurement points between each pair of receivers. The measurement points may be arranged according to mathematical relationships. Another view of the invention includes at least two of the distances between each of the measurement points and the first and second receivers being the same. Two of the distances that may be the same are the distance between the first transmitter and its closest measurement point and the distance between the second transmitter and its most distant measurement point. Other distances may also be the same, or there may only be one pair of identical distances. Alternately, none of these distances may be the same.

The resistivity tool may also utilize one or more transceivers to improve performance. The resistivity tool may also be compensated, if desired. The invention may also be thought of as an analogous method.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
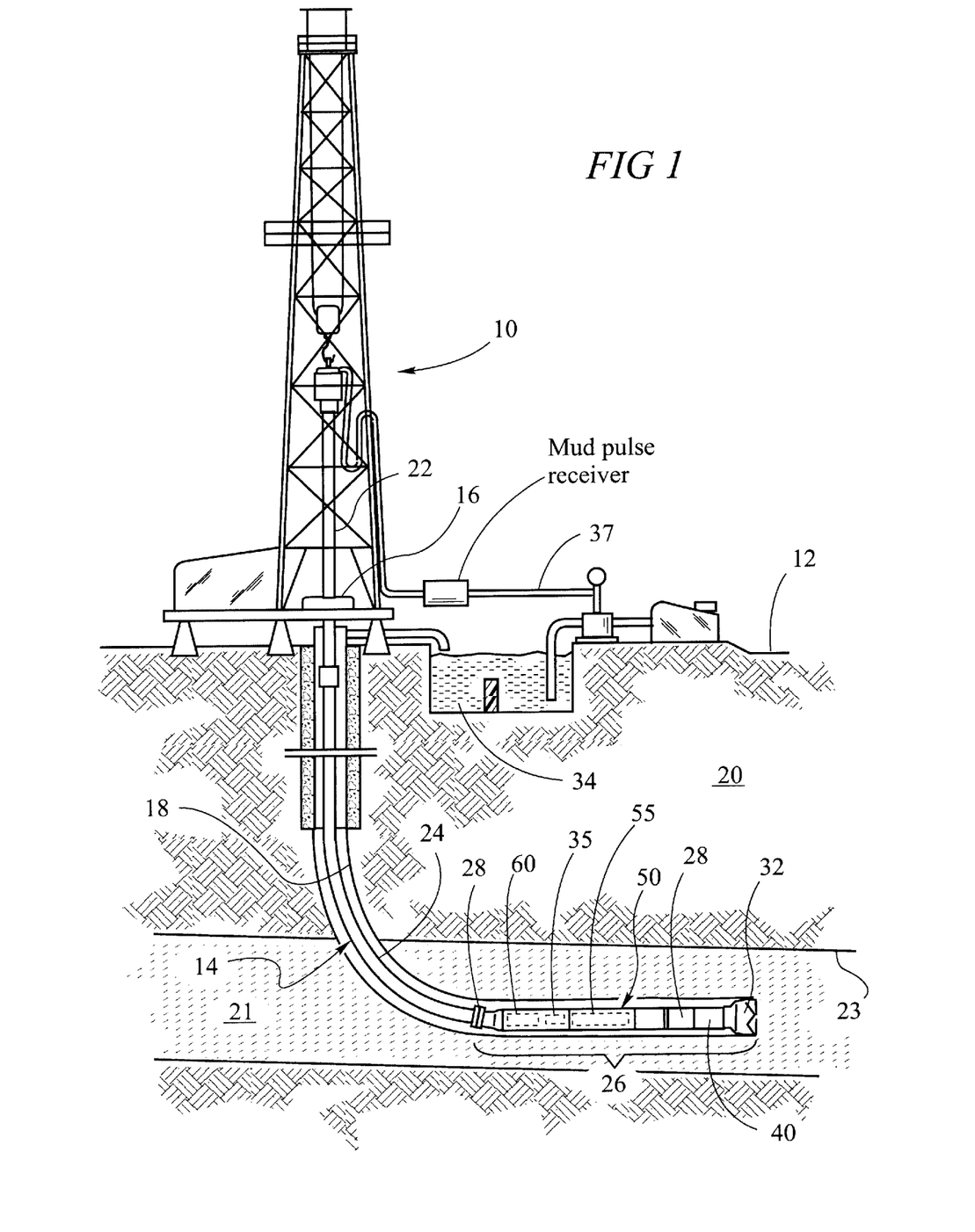
FIG. 1 is an illustrative example of a drilling system.

Referring now to FIG. 1, a drilling installation includes a drilling rig 10 at the surface 12 of a well, supporting a drill string 14. The drill string 14 penetrates through a rotary table 16 and into a borehole 18 that is drilled through earth formations 20 and 21. The drill string 14 includes a kelly 22 at its upper end, drill pipe 24 coupled to the kelly 22, and a bottom hole assembly 26 (commonly referred to as a "BHA") coupled to the lower end of the drill pipe 24. The BHA 26 includes a drill bit 32, a downhole motor 40, one or more drill collars 28, a resistivity tool 50 mounted on collar section 55, MWD sensors positioned in a collar section 55, directional MWD sensors located in a non-magnetic section 60, and one or more stabilizer(s) (not shown) for penetrating through earth formations to create the borehole 18. In operation, the kelly 22, the drill pipe 24 and the BHA 26 are rotated by the rotary table 16. The drill collars 28, which also may be non-magnetic so as not to interfere with the MWD measurements, are used in accordance with conventional techniques to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate underground formations.

As the drill bit 32 operates, drilling fluid or mud is pumped from a mud pit 34 at the surface through the kelly hose 37, into the drill pipe 24, to the drill bit 32. After flowing through the drill bit 32, the drilling mud rises back to the surface through the annular area between the drill pipe 24 and the borehole 18, where it is collected and returned to the mud pit 34 for filtering. The drilling mud is used to lubricate the drill bit 32 and to remove cuttings from the borehole 18. The drilling mud may also perform a number of other function, which could include providing operating power to the downhole motor or other components downhole. As one skilled in the art will realize, the downhole motor or turbine 40 may be used downhole to rotate the drill bit 32 as an alternative, or in addition to, rotating the drill string from the surface.

As shown in FIG. 1, BHA 26 typically is defined as all of the downhole components from the top of the drill collars 28, down to the drill bit 32, including downhole motor 40. As one skilled in the art will understand, downhole motor 40 is an optional component, which may be omitted from the BHA 26 if desired. In the preferred embodiment, the BHA 26 preferably includes a measurement while drilling system, referred to herein as an "MWD system".

As is known in the art, an MWD system typically includes directional MWD sensors and drilling parameter sensors such as weight-on-bit (WOB), torque-on-bit (TOB), shock, vibration, etc. In one embodiment, directional sensors are provided in the BHA 26 to provide an indication of inclination angle, the horizontal angle, and the rotational angle (a.k.a. "tool face angle") of the BHA 26. In accordance with known techniques, wellbore directional measurements can be made.

The MWD tool preferably is located close to the drill bit 32 to facilitate the ability to examine the formation as close to the bit as possible. As one skilled in the art will understand, the MWD tool could also be located further up the BHA 26 from the drill bit 32 without departing from the principles of the present invention. Moreover, the MWD tool may in actuality comprise multiple collar sections if necessary to house other MWD sensors. The MWD formation sensors preferably include the present resistivity tool, as well as gamma, sonic, density and neutron sensors in accordance with normal industry practice. A battery pack or other power source may be included in the MWD tool, or alternatively may be positioned in any convenient location to provide power to the various electrical assemblies in the BHA.

Still referring to FIG. 1, downhole data signaling unit 35 could be provided as part of BHA 26 and is used to transmit sensed values to a surface receiver via a mud pulse signal. The drilling mud can serve as a communication medium between the controller and components at the surface of the well. By altering the flow of the drilling mud through the interior of the drillstring, pressure pulses may be generated in the column of drilling mud. By selectively varying the pressure pulses through the use of a mud pulser in the mud signaling unit 35, encoded binary pressure pulse signals can be generated to carry information indicative of downhole parameters to the surface for immediate analysis. In addition, the downhole system may also include the capability of receiving mud pulse signals from the surface to control the operation or activation of certain MWD sensors or other downhole components. Alternately, a composite drill string having embedded wires could be used to transmit data to the surface, or data could be saved downhole.

A downhole controller (not shown) may control the operation of signaling unit 35 and orchestrate the operation of the MWD and LWD sensors and other BHA components. The controller may be located in sub 60 or elsewhere in the BHA 26. The controller also may make decisions based upon the processed data.

The stabilizer could include adjustable blades in accordance with the disclosure in commonly assigned U.S. Pat. Nos. 5,318,137 and 5,318,138, the teachings of which are incorporated by reference as if fully set forth herein. As disclosed in these inventions, the inclination of the bottom-hole assembly can be changed by selectively varying the extension of the stabilizer blades. As one skilled in the art will immediately recognize, the course of the BHA 26 also can be changed in accordance with other techniques, such as by selectively turning on or off a downhole motor, adjusting the angle of bend in a bent motor housing, or changing the weight on bit of the system. Use of such an adjustable component downhole in conjunction with an LWD system as disclosed herein makes it possible to design a "Smart System" for drilling certain portions of the wellbore automatically. Alternately, any other suitable system or assembly may be used for directional drilling without departing from the scope of the teachings herein. For example, coiled tubing drilling may be used.

In many cases, the lower end of the borehole is deviated substantially from vertical, as shown in FIG. 1, so as to extend the length of its passage through an oil-bearing formation such as 21. Thus, it is desirable to provide a tool capable of detecting and locating bed boundaries such as 23. Although in FIG. 1 BHA 26 is deviated approximately 90 degrees from vertical, it will be understood that the present invention can be used to advantage in any similar situation wherein it is desired to locate a bed boundary 23 that is located to one side, rather than ahead, of collar section 55.

Figure 7:
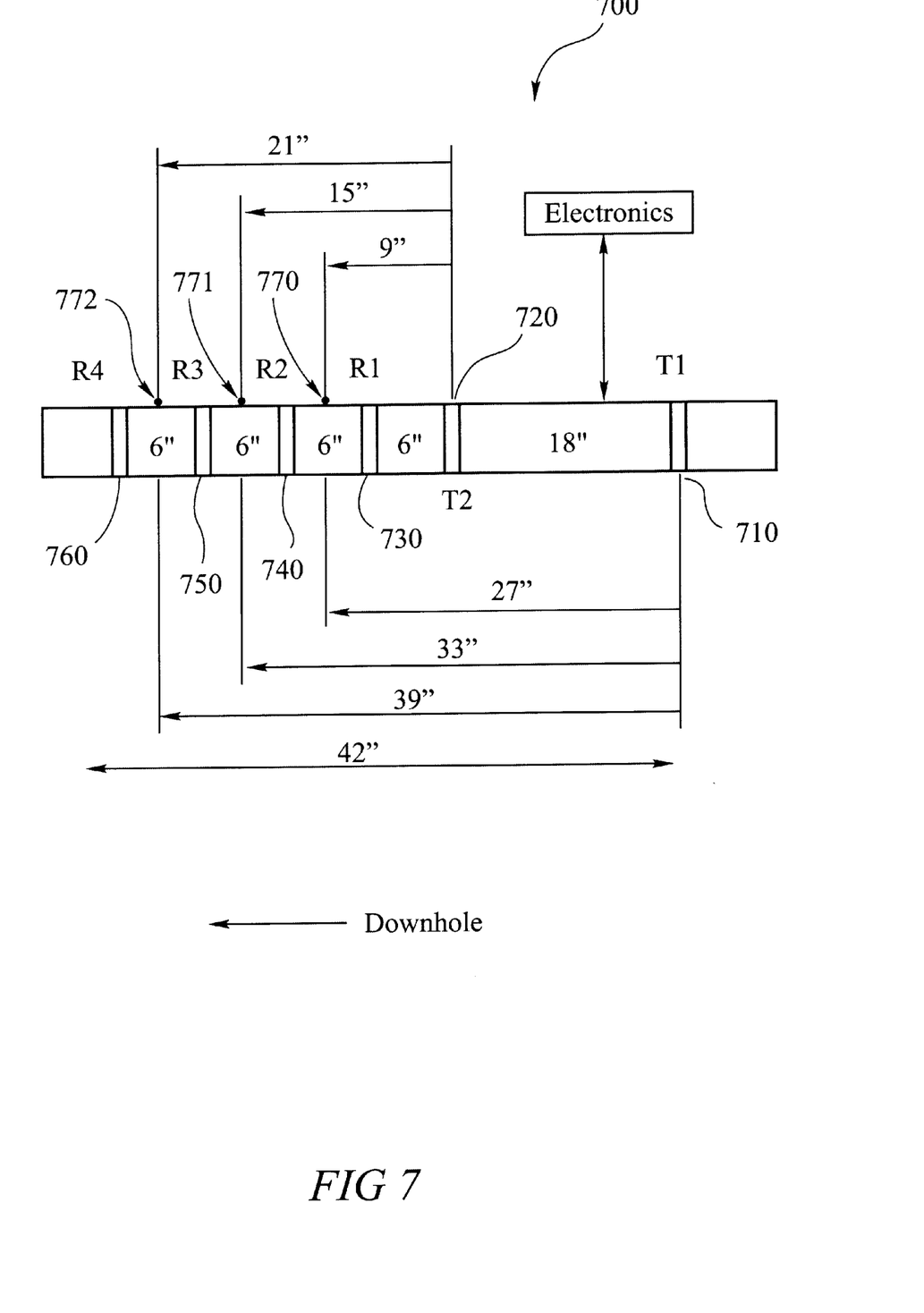
FIG. 7 is a resistivity tool built in accordance with a first embodiment of the invention.

FIG. 7 illustrates an embodiment of a resistivity tool 700 built in accordance with the teachings of the invention. Progressing down the tool, it includes a first transmitter 710, a second transmitter 720, a first receiver 730, a second receiver 740, a third receiver 750, and finally a fourth receiver 760 closest to the drill bit (not shown). Also included are associated electronics at any appropriate location. These electronics may fire each transmitter at one or more particular frequencies, circuitry for detecting the resulting signal at each receiver, and memory for storing the detected waveforms. It is currently envisioned that each receiver should be attached to the electronics by a dedicated cable, although this feature is not necessary to the invention. The transmitters and receivers may appropriately be wires or coils wrapped around the outside of a drill string, as is well known. The transmitters and receivers may also be any other appropriate type or location. Each of the measurement locations 770–772 is located half-way between respective pairs of adjacent receivers R1–R2, R2–R3, and R3–R4. A direction labeled "downhole" is also shown to assist in an understanding of this embodiment.

In the embodiment shown, receiver 730 and transmitter 720 are separated by 6". A distance of 6" also exists between each of the receivers 730, 740, 750, 760. Transmitter 710 is located 18" uphole from transmitter 720, making the entire tool a compact 42", although these exact distances are not crucial to the invention. One particular advantage of the embodiment shown is the regular and incremental increase of measurement spacing distances. As can be seen, a first measurement distance between transmitter T2 and measurement point 770 exists and is 9". A second measurement distance, between transmitter T2 and point 771 is 15". A third measurement distance between transmitter T2 and point 772 is equal to 21". As such, the resistivity tool of FIG. 7 may more generally be described according to the equations:

$$S_i = d_i + d_2(n-1) + \frac{d_2}{2} + d_3(m-1) \quad (1)$$

for i=(m−1)(R−1)+n.
where
S=measurement spacing (transmitter to midpoint of receiver pair)
R=total no. of receivers
n=receiver no.
m=transmitter no.
$d_1$=distance between $T_1$ and $R_1$
$d_2$=distance between receivers
$d_3$=distance between transmitters
where the transmitters and receivers are arranged:
$R_n \ldots R_2\ R_1\ T_1\ T_2 \ldots T_m$.
Consequently, the optimal spacings occur when:

$$d_3 = d_2(R-1) \quad (2)$$

Here, $d_1$=6", $d_2$=6" and $d_3$=18". As can be appreciated by one of ordinary skill in the art, a series of equally spaced measurements results (e.g., 9", 15", 21", 27", 33", 39").

During operation, the transmitters fire sequentially at one or more pre-selected frequencies controlled by the current source and associated electronics. While the teachings herein could be applied to a tool that fires its transmitters simultaneously and at different frequencies, sequential firing of the transmitters is an accepted manner of operating resistivity tools and thus should find industry acceptance. For example, transmitters 710 and 720 may fire sequentially at 2 MegaHertz (MHz) and then at 400 KHz, resulting in a total of four firings by the transmitters. Each firing results in a EM wave propagating through the surrounding formation. The signal waveform is then detected at each receiver. Corresponding resistivity measurements consequently exist as described above at measurement locations 770–772. Further, other measurement points exist corresponding to non-adjacent receivers. Another measurement point (coinciding with the location of receiver R3) lies between receivers R2 and R4 and yet another measurement point (coinciding with the location of receiver R2) lies between receivers R1 and R3. Further, receivers R1 and R4 can be used to obtain another resistivity reading at measurement point 771 between receivers R2 and R3, but at a different depth of investigation into the formation.

Electronics associated with each receiver detects the response at each receiver, and the resulting waveform may be transmitted to the surface, saved, or otherwise processed. The measurements may be taken while drilling, and also may be taken while the drill bit is being removed or "tripped" from the wellbore.

Comparison of the pertinent waveforms, or the difference of these waveforms, indicates phase shift and amplitude attenuation of the wave traveling through the formation surrounding the wellbore. In particular, the phase shift and attenuation between selected receivers may be determined by independently monitoring each receiver and obtaining the corresponding absolute phase and amplitude at each receiver. Alternately, it may also be possible to determine phase shift and attenuation by measuring the difference of these absolute measurements between pairs of receivers.

The use of more than two receivers, as shown in the embodiment of FIG. 7, makes this system more robust than prior art resistivity tools that included only a pair of receivers. Each firing by a transmitter results in a reading at each receiver. Thus, in the shown embodiment, each firing by a transmitter results in four readings by the receivers, as contrasted to the one reading that is obtained by using only a pair of receivers. As such, sixteen waveform readings at the receivers results from only four firings of the transmitters.

The reduced number of firings allows the tool to collect the same amount of data as prior art resistivity tools in less time. This allows faster movement of the tool past the borehole wall. This fast data acquisition should result in wireline quality logs even when the bottomhole assembly is being removed from the wellbore at a high rate, a feat unattainable with prior resistivity tools. Further, if sufficient data transmission speeds from downhole can be achieved, the invention also provides an operator a more clear idea of the conditions downhole "real time" during the drilling of the wellbore.

In addition, not only do fewer firings of the transmitters result in more data, but this data is not spread out along the length of the borehole. In particular, as a general matter, each firing of a resistivity tool transmitter occurs at a particular point or location along the borehole wall. As a resistivity tool moves past the borehole wall at faster and faster speeds, the locations in the wellbore corresponding to the firing of the transmitters become spaced further and further apart. Thus, the data corresponding to the transmitters actually corresponds to different depths in the wellbore, complicating the task of data interpretation. Of course, resistivity tools with many transmitters worsen this problem. However, when only a single transmitter is used to collect data at more than two receivers, the total time between subsequent data sets is significantly less. Therefore, higher data density can be achieved. Consequently, the disclosed embodiments of the present invention give a better picture of the formation resistivity.

Another benefit of this design is that fewer transmitters and a greater number of receivers result in lower power requirements to obtain the same amount of resistivity data.

Another benefit stems from the equal interval spacing of the measurement points 770–772. The equal interval spacing of these measurement points helps the interpretation of the resistivity logs. In particular, depth of investigation into a formation corresponds to both the resistivity of the formation and the spacing between a fired transmitter and a measurement point. Normally, resistivity of the formation is not known before it is measured by the resistivity tool. This dictates that a wide range of diameters of investigation are needed to accurately describe the resistivity profile around a wellbore. Further, because design and construction of a resistivity tool is very expensive, a single design is preferable to multiple designs. Many measurements with incrementally spaced diameters of investigation allow an operator to be confident that his resistivity tool will provide accurate measurements, regardless of the formation being drilled. Thus, multiple receivers which are equally spaced results in a "universal" resistivity tool capable of being used in any formation.

Modification of this design is possible. It should be emphasized that the distances shown are not crucial to the invention and that advantages from the teachings herein may still be obtained using different measurements and by varying the spacings in less than a regular manner. More or fewer receivers may also be used, so long as at least three receivers are employed. For example, a resistivity tool similar to that shown in FIG. 7 might include only three receivers, and could place the transmitters apart by only 12 inches. This would result in measurement spacings of 9, 15, 21, and 27 inches and a total tool length of only 30 inches.

Figure 8:
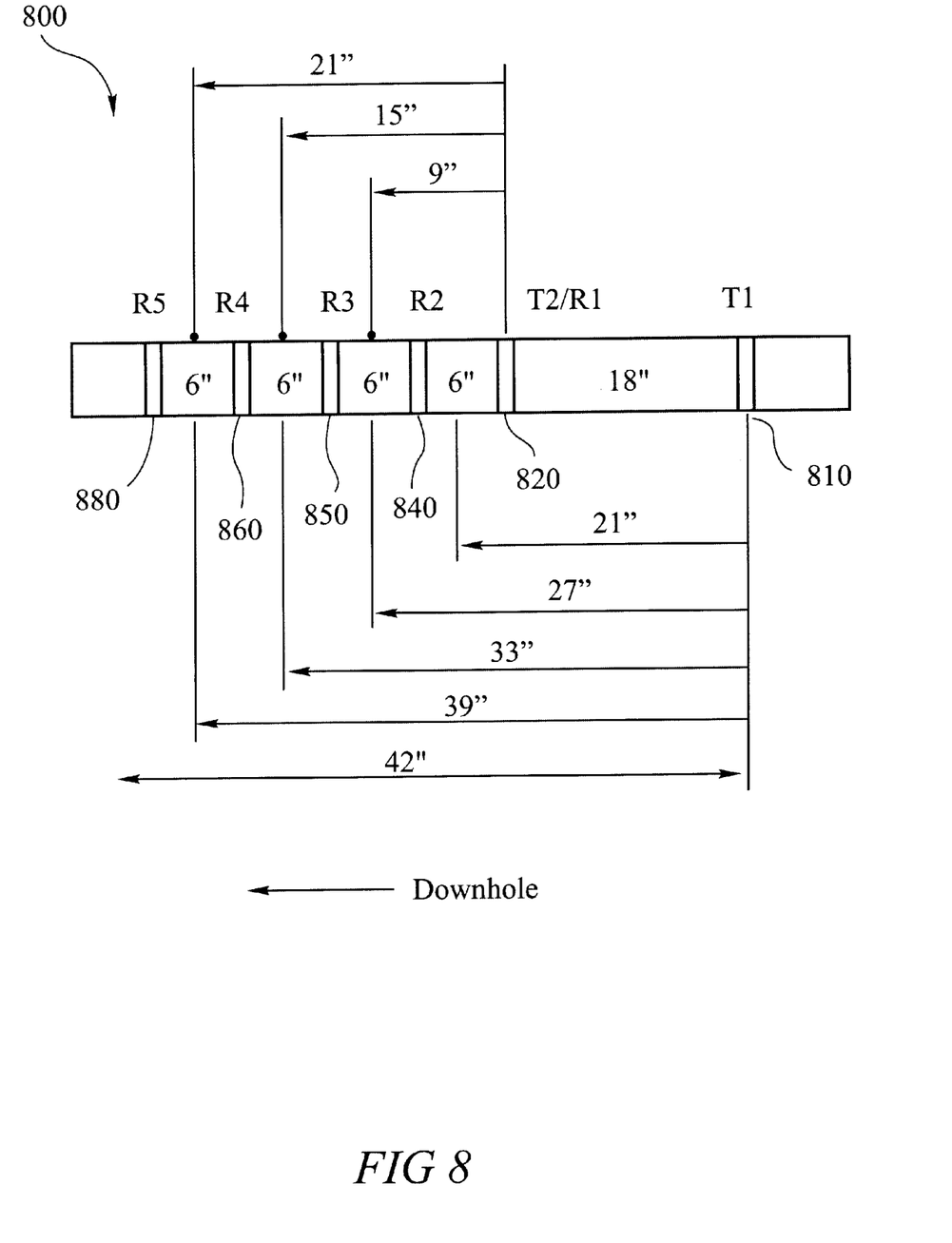
FIG. 8 is a resistivity tool built in accordance with a second embodiment of the invention.

FIG. 8 shows a second embodiment of the invention. This design includes many of the advantages of the embodiment shown in FIG. 7 and also includes other features. Tool 800 includes a first transmitter T1 810, a transceiver T2/R1 820 that doubles as a first receiver and a second transmitter, a second receiver R2 840, a third receiver R3 850, a fourth receiver R4 860, and a fifth receiver R5 880. In the shown embodiment, six inches (6") separate elements 820, 840, 850, 860 and 880. Transmitter T1 is offset from transceiver 820 by eighteen inches (18"). This makes the total length of the tool 42". These measurement spacings are not crucial to the invention, however.

Each transmitter of the embodiment shown in FIG. 8 is fired sequentially. Upon the firing of transmitters T1, transceiver 820 acts as a receiver. Transceiver 820 then operates as a transmitter. Each receiver detects a waveform from each firing of the transmitters and transceivers. While the exact order of firings is not critical, it can be seen that the use of transceivers in the design of the tool increases the number of detected waveforms while keeping the design very compact. The measurements are provided in the table below:

TABLE 1

| Transmitters | Receivers | Spacing | Resolution | Attenuation | Phase |
|---|---|---|---|---|---|
| T2 | R2/R3 | 9" | 6" | A1 | P1 |
| T2 | R4/R3 | 15" | 6" | A2 | P2 |
| T2 | R4/R5 | 21" | 6" | A3 | P3 |
| T1 | R2/R3 | 27" | 6" | A4 | P4 |
| T1 | R3/R4 | 33" | 6" | A5 | P5 |
| T1 | R4/R5 | 39" | 6" | A6 | P6 |
| T2 | R2/R4 | 12" | 12" | A7 | P7 |
| T2 | R3/R5 | 18" | 12" | A8 | P8 |
| T1 | R1/R3 | 24" | 12" | A9 | P9 |
| T1 | R2/R4 | 30" | 12" | A10 | P10 |
| T1 | R3/R5 | 36" | 12" | A11 | P11 |
| T2 | R2/R5 | 15" | 18" | A12 | P12 |
| T1 | R1/R4 | 27" | 18" | A13 | P13 |
| T1 | R2/R5 | 33" | 18" | A14 | P14 |
| T1 | R1/R5 | 30" | 24" | A15 | P15 |

As described with respect to FIG. 7, tool 800 includes additional measurement points between non-adjacent receiver pairs (e.g. receivers R2 and R4, or R2 and R5 ). Thus, while the spacing of the elements in FIG. 8 results in the advantages described with respect to resistivity tool 700, resistivity tool 800 also includes a twenty one inch spacing between transmitter T1 and the measurement point between receivers 820 and 840. Twenty one inches is also the distance between transceiver 820 and the measurement point between receivers 860 and 880. This arrangement provides an additional quality check that helps ensure the proper operation of the tool 800.

Figure 9:
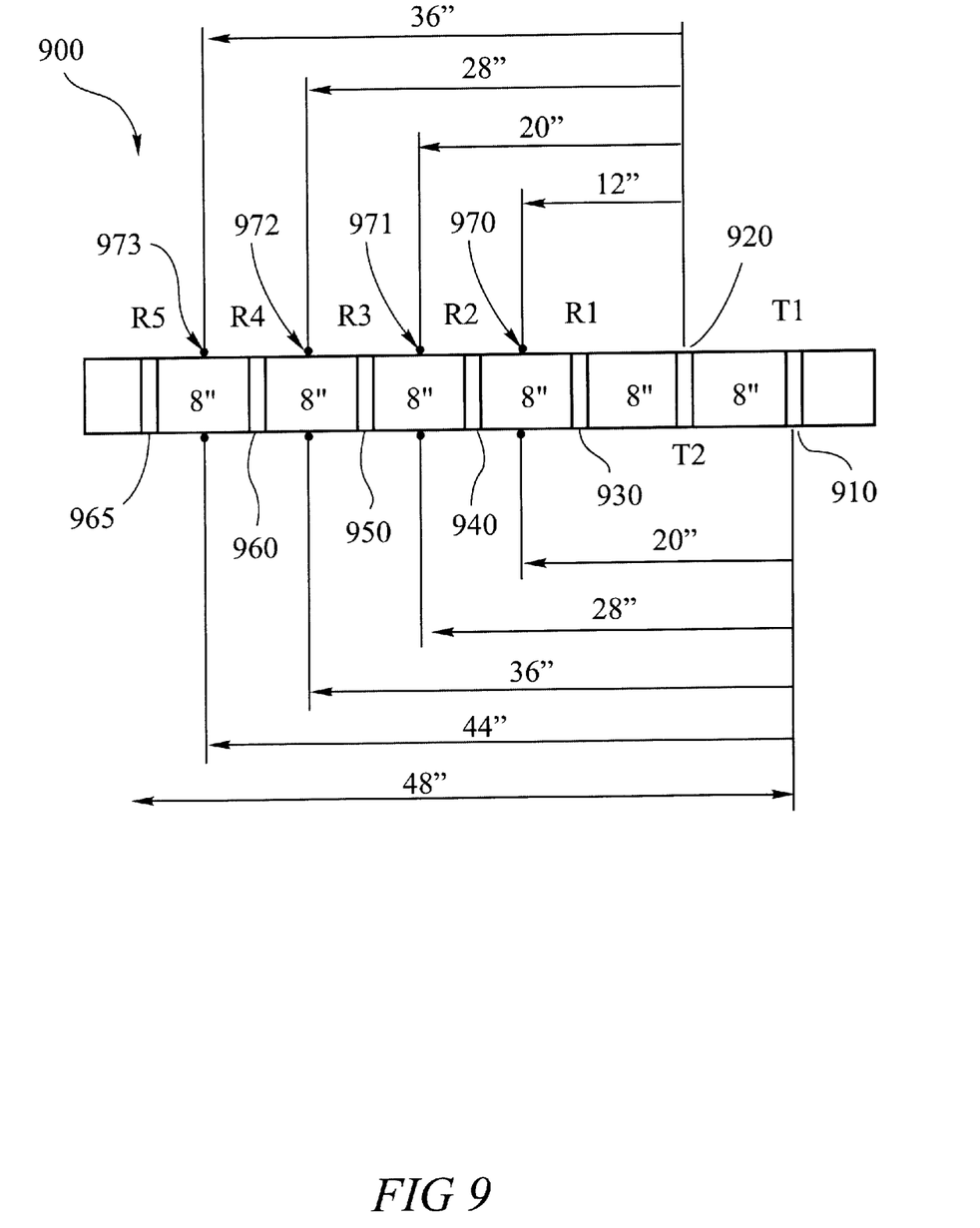
FIG. 9 is a resistivity tool built in accordance with a third embodiment of the invention.

FIG. 9 includes a tool 900 having a first transmitter T1 910, a second transmitter T2 920, a first receiver R1 930, a second receiver R2 940, a third receiver R3 950, a fourth receiver R4 960, and a fifth receiver R5 965. Also shown are measurement points 970–973. Each measurement point is located halfway between a corresponding pair of adjacent receivers. As can be seen, each element is spaced from its neighbor by a distance of eight inches (8"), making the tool length 48". As can be seen by reference to FIG. 9, a distance of 12", 20", 28", and 36" exists between transmitter T2 and respective measurement points 970–973. A distance of 20", 28", 36" and 44" exists between transmitter T1 and respective measurement points 970–973. Consequently, the measurement distances of 20", 28", and 36" are present with both transmitters and can be used for error checking. These exact measurement spacings are not necessary, however, to the invention.

In addition, as explained with reference to FIG. 7, additional measurements may be obtained. For example, receivers R1 and R3 may be used to obtain a resistivity reading at a location corresponding to the placement of receiver R2. Likewise, receivers R2 and R4, and R3 and R5, may be used to establish resistivity measurements at locations between them. Receivers R1 and R4 can be used to obtain a reading at measurement point 971, and receivers R2 and R5 can be used to measure resistivity at point 972.

While preferred embodiments of this invention have been shown and described, modifications thereof can be made by one skilled in the art without departing from the spirit or teaching of this invention. For example, transceivers may be advantageously used in any suitable resistivity tool having more than two receivers. The transmitter and receiver spacings may be modified somewhat and still achieve the advantages of the invention. Transmitters may be added to the design on the downhole side to achieve a compensated or pseudo-compensated design. Consequently, the embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A resistivity tool suitable to use in a borehole, comprising:

a first transmitter and a second transmitter;

a first receiver located remotely from said first transmitter, said first receiver being at a first location;

a second receiver located remotely from said first transmitter, said second receiver being at a second location;

a third receiver located remotely from said first receiver, said third receiver being at a third location; and first electronics associated with said first transmitter, said electronics firing said first transmitter at one or more preselected frequencies to generate an electromagnetic wave, wherein the distance between said first receiver and said second receiver is approximately the same as the distance between said second receiver and said third receiver, with the distance between said first transmitter and said second transmitter having about a magnitude according to the equation $d_3=d_2(R-1)$, where $d_2$=distance between receivers $d_3$=distance between transmitters; and R=total no. of receivers.

2. The resistivity tool of claim 1, further comprising second electronics connected to each of said first receiver, second receiver, and third receiver, wherein said receivers detect said electromagnetic wave, and transmit to said second electronics in response, wherein said amplitude and phase angle of said electromagnetic wave detected at said receivers are measured by at least one of said first and second electronics.

3. The resistivity tool of claim 1, further comprising second electronics connected to each of said first receiver, second receiver, and third receiver, wherein said receivers detect said electromagnetic wave, and transmit to said second electronics in response, wherein said attenuation and phase shift of said electromagnetic wave detected at said receivers are measured by at least one of said first and second electronics.

4. The resistivity tool of claim 3, wherein said first receiver is spaced from said second receiver by a distance equal to the spacing between said second receiver and said third receiver.

5. The resistivity tool of claim 1 including at least three receivers, wherein a resistivity measurement point exists between each pair of receivers and further wherein there exists distances between each of said resistivity measurement points and said first transmitter, and each of said resistivity measurement points and said second transmitter, wherein a first of said distances approximately equals a second of said distances.

6. The resistivity tool of claim 5, wherein said first of said distances is from said first transmitter to a closest resistivity measurement point with respect to said first transmitter, and said second of said distances is from said second transmitter to a most distant resistivity measurement point with respect to said second transmitter.

7. The resistivity tool of claim 5, wherein said measurement points are for adjacent receivers, and further wherein a third of said distances approximates a fourth of said distances.

8. The resistivity tool of claim 5, wherein said measurement points are for adjacent receivers, and further wherein said first and second distances are the only distances of said distances that are approximately equal.

9. The resistivity tool of claim 1, wherein said second transmitter is a transceiver having a receive mode and a transmit mode, with said transceiver being capable of generating an electromagnetic wave when said transceiver is in said transmit mode and capable of detecting an electromagnetic wave when said transceiver is in said receive mode.

10. The resistivity tool of claim 4, wherein said resistivity tool has a downhole direction defined by a drill bit attached to said resistivity tool, said second transmitter being in a downhole direction with respect to said first, second, and third receivers.

11. The resistivity tool of claim 10, wherein said resistivity tool is compensated.

12. The resistivity tool of claim 1, further comprising a fourth receiver.

13. The resistivity tool of claim 12, further comprising:
a second transmitter;
a first measurement point between said first receiver and said second receiver;
a second measurement point between said second receiver and said third receiver;
a third measurement point between said third receiver and said fourth receiver;
wherein a distance of approximately nine inches exists between said first measurement point and said second transmitter;
wherein a distance of approximately fifteen inches exists between said second measurement point and said second transmitter;
wherein a distance of approximately twenty one inches exists between said third measurement point and said second transmitter;
wherein a distance of approximately twenty seven inches exists between said first measurement point and said first transmitter;
wherein a distance of approximately thirty three inches exists between said second measurement point and said first transmitter;
wherein a distance of approximately thirty nine inches exists between said third measurement point and said first transmitter.

14. The resistivity tool of claim 12, further comprising:
a transceiver being both said first receiver and a second transmitter;
a fifth receiver;
a first measurement point between said first receiver and said second receiver;
a second measurement point between said second receiver and said third receiver;
a third measurement point between said third receiver and said fourth receiver;
a fourth measurement point between said fourth receiver and said fifth receiver;
wherein a distance of approximately nine inches exists between said second measurement point and said second transmitter;
wherein a distance of approximately fifteen inches exists between said third measurement point and said second transmitter;
wherein a distance of approximately twenty one inches exists between said fourth measurement point and said second transmitter;
wherein a distance of approximately twenty one inches exists between said first measurement point and said first transmitter;
wherein a distance of approximately twenty seven inches exists between said second measurement point and said first transmitter;
wherein a distance of approximately thirty three inches exists between said third measurement point and said first transmitter;
wherein a distance of approximately thirty nine inches exists between said fourth measurement point and said first transmitter.

15. The resistivity tool of claim 12, further comprising:
a second transmitter;
a fifth receiver;
a first measurement point between said first receiver and said second receiver;
a second measurement point between said second receiver and said third receiver;
a third measurement point between said third receiver and said fourth receiver;
a fourth measurement point between said fourth receiver and said fifth receiver;
wherein a distance of approximately twelve inches exists between said first measurement point and said second transmitter;
wherein a distance of approximately twenty inches exists between said second measurement point and said second transmitter;

wherein a distance of approximately twenty eight inches exists between said third measurement point and said second transmitter;

wherein a distance of approximately thirty six inches exists between said fourth measurement point and said second transmitter;

wherein a distance of approximately twenty inches exists between said first measurement point and said first transmitter;

wherein a distance of approximately twenty eight inches exists between said second measurement point and said first transmitter;

wherein a distance of approximately thirty six inches exists between said third measurement point and said first transmitter;

wherein a distance of approximately forty four inches exists between said fourth measurement point and said first transmitter.

16. A method for determining optimally spaced transmitters and receivers in a propagation resistivity tool, comprising:

(a) providing at least three receivers on a resistivity tool, each adjacent pair of receivers being spaced at about a constant distance apart;

(b) providing two transmitters on said resistivity tool, wherein the distance between said two transmitters is equal to said constant distance between said multiple receiver pairs multiplied by one fewer than the number of receivers.

17. The method of claim 16, wherein the spacing from either transmitters to the midpoint of each receiver pair may be described as:

$$S_i = d_1 + d_2(n-1) + \frac{d_2}{2} + d_3(m-1)$$

for i=(m−1) (R−1)+n, where

S=measurement spacing (transmitter to midpoint of receiver pair)

R=total no. of receivers n=receiver no.

m=transmitter no.

$d_1$=distance between $T_1$ and $R_1$ $d_2$=distance between receivers $d_3$=distance between transmitters and where the transmitters and receivers are arranged according to the pattern $R_n \ldots R_2\ R_1\ T_1\ T_2 \ldots T_m$.

18. The method of claim 16, where there are only two transmitters.

* * * * *